(12) United States Patent
Yamawaki et al.

(10) Patent No.: US 9,333,666 B2
(45) Date of Patent: May 10, 2016

(54) IMAGE FORMING APPARATUS, SECURITY PRINTING METHOD, AND STORAGE MEDIUM

(71) Applicants: Taku Yamawaki, Tokyo (JP); Shuko Kuwano, Kanagawa (JP); Yutaka Matsumura, Kanagawa (JP)

(72) Inventors: Taku Yamawaki, Tokyo (JP); Shuko Kuwano, Kanagawa (JP); Yutaka Matsumura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/584,173

(22) Filed: Dec. 29, 2014

(65) Prior Publication Data

US 2015/0183208 A1    Jul. 2, 2015

(30) Foreign Application Priority Data

Dec. 27, 2013  (JP) ................................. 2013-272438
Dec. 2, 2014   (JP) ................................. 2014-244401

(51) Int. Cl.
| G06K 15/00 | (2006.01) |
| B26F 1/00  | (2006.01) |
| B41J 29/00 | (2006.01) |
| G03G 15/00 | (2006.01) |

(52) U.S. Cl.
CPC ................. *B26F 1/00* (2013.01); *B26F 1/0092* (2013.01); *B41J 29/00* (2013.01)

(58) Field of Classification Search
None
See application file for complete search history.

(56) References Cited

U.S. PATENT DOCUMENTS

| 8,164,765 B2 * | 4/2012 | Anno et al. ................... 358/1.13 |
| 8,395,793 B2 * | 3/2013 | Nishikawa ................... 358/1.15 |
| 2006/0050290 A1 * | 3/2006 | Kondo ......................... 358/1.13 |
| 2008/0231888 A1 * | 9/2008 | Kuwano ....................... 358/1.15 |

FOREIGN PATENT DOCUMENTS

JP    2008-003113    1/2008

* cited by examiner

*Primary Examiner* — Marivelisse Santiago Cordero
*Assistant Examiner* — Neil R McLean
(74) *Attorney, Agent, or Firm* — Oblon, McClelland, Maier & Neustadt, L.L.P.

(57) ABSTRACT

An image forming apparatus having security printing function, connectable to a post-processing apparatus capable of cutting a sheet, includes a sheet size detector to detect a size of a sheet to be conducted with print processing, a dividing number acquiring unit to acquire a dividing number of the sheet, a sheet divider to divide the sheet into a plurality of areas based on the sheet size detected by the sheet size detector and the dividing number acquired by the dividing number acquiring unit, a security printing setting acquiring unit to acquire setting of a position of security printing, and a security printing position determination unit to determine a print position of security printing on each of the plurality of areas, divided by the sheet divider, based on the position of security printing acquired by the security printing setting acquiring unit.

3 Claims, 13 Drawing Sheets

FIG. 6
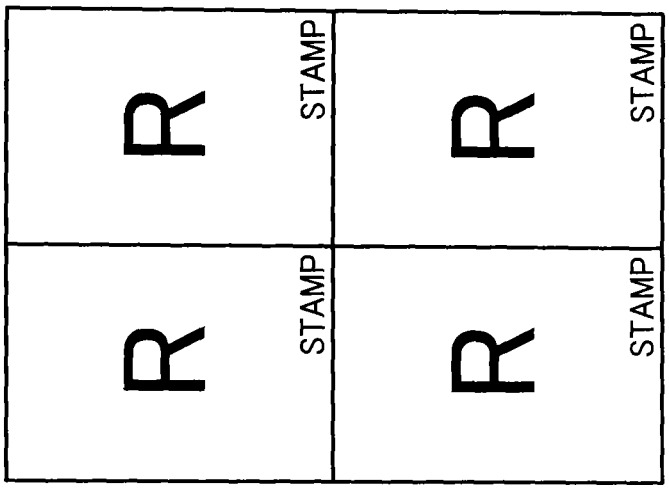
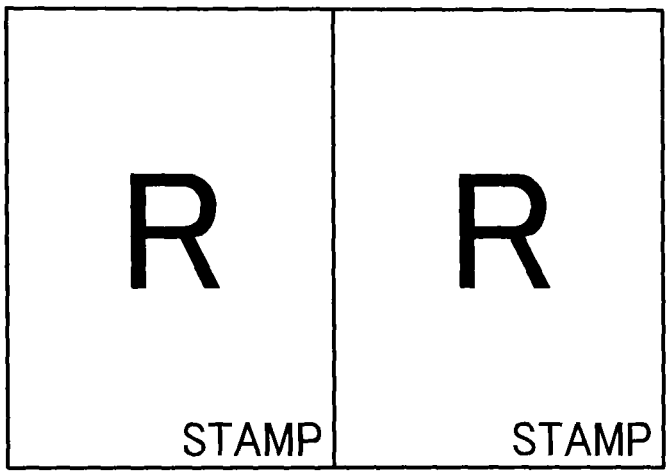
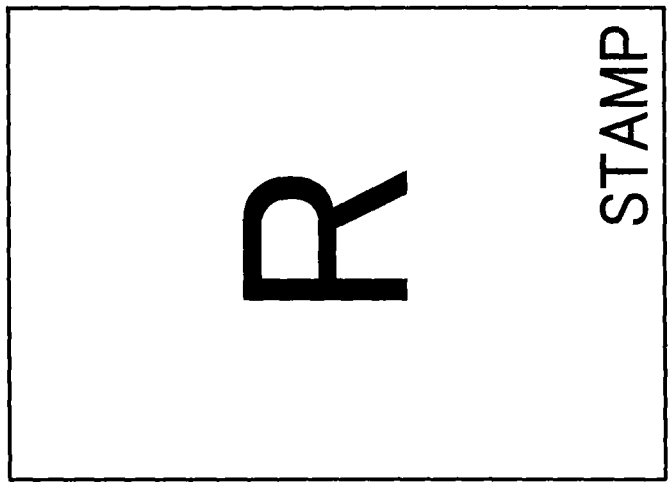

RIGHT  TOP  LEFT  BOTTOM

FIG. 9A
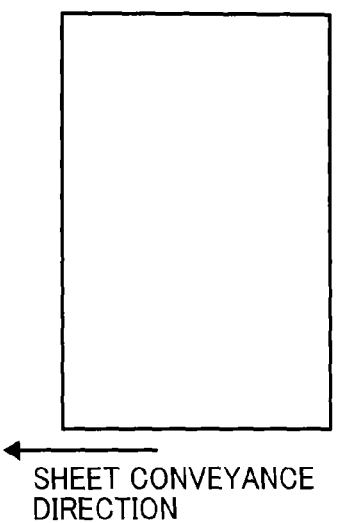
LONG EDGE FEED (LEF)
← SHEET CONVEYANCE DIRECTION
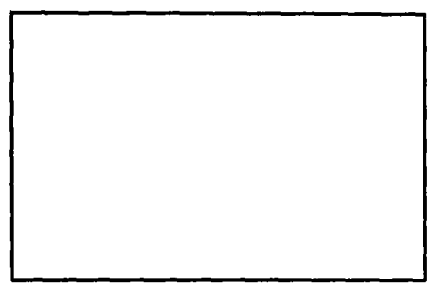
SHORT EDGE FEED (SEF)
← SHEET CONVEYANCE DIRECTION
FIG. 9B
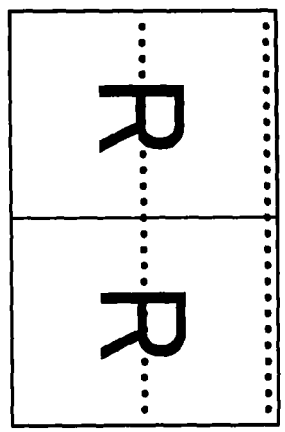
FIG. 10A
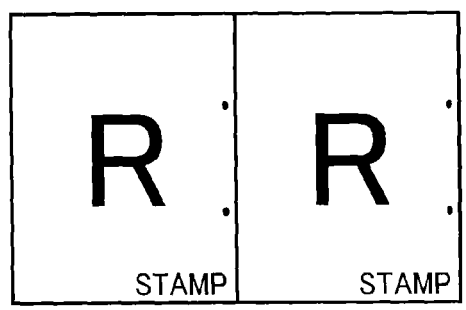
TWO HOLES
FIG. 10B
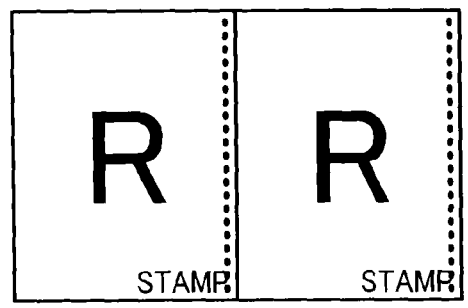
MULTIPLE HOLES

STAMP AND DOUBLE PUNCHING OVERLAP,
AND PART OF STAMP IS MISSING.

ADJUST STAMP POSITION

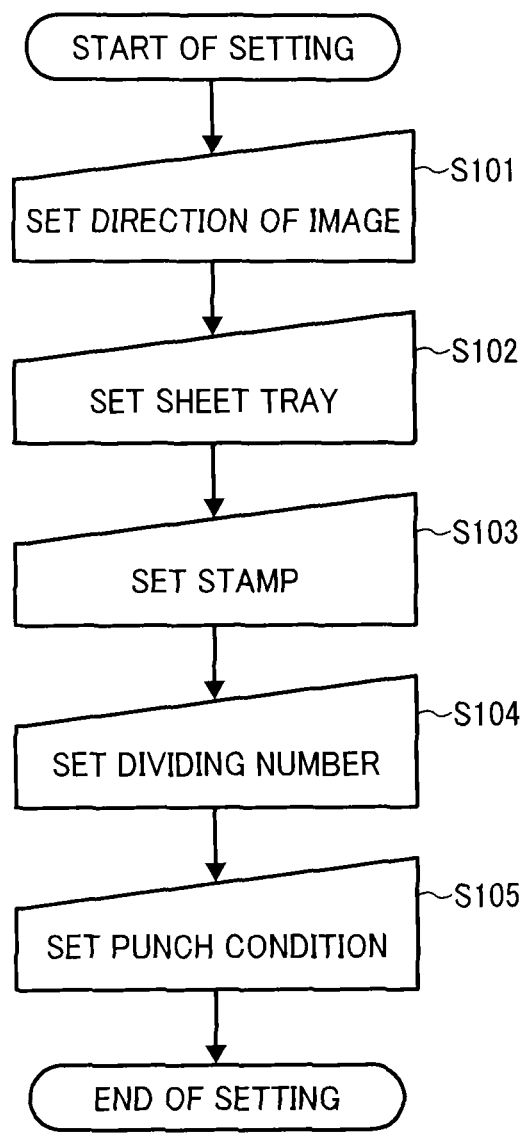

IMAGE FORMING APPARATUS, SECURITY PRINTING METHOD, AND STORAGE MEDIUM

CROSS-REFERENCE TO RELATED APPLICATION

This application claims priority pursuant to 35 U.S.C. §119 (a) to Japanese Patent Application Nos. 2013-272438, filed on Dec. 27, 2013, and 2014-244401, filed on Dec. 2, 2014 in the Japan Patent Office, the disclosure of which are incorporated by reference herein in their entirety.

BACKGROUND

1. Technical Field

The present invention relates to an image forming apparatus, and a security printing method for an image forming apparatus.

2. Background Art

Security printing that prints a user name, printed time, and a matrix type two-dimensional code compulsory on sheets such as transfer sheets is known. By compulsory printing the user name, printed time and matrix type two-dimensional code as a stamp on document sheets having high security level, taking out of high-security level document by printing the documents can be prevented.

Further, post-processing after printing such as double copy and double punching is known. The double copy means printing one same image on each of two areas on one sheet by divining the one sheet into the two areas. The double punching means process of perforating punch holes at two portions of a printed sheet, and then the punched sheet is cut into two sheets so that the two sheets can be used independently. By using these functions, an amount of sheets can be saved and printing cost can be reduced.

The above mentioned post-processing is followed by a process of cutting the sheet after the printing. Therefore, when the post-processing is combined with the security printing, security printing may not be conducted on one of the cut sheets, and thereby security printing effect cannot be obtained for the cut sheet.

SUMMARY

In one aspect of the present invention, an image forming apparatus having security printing function, connectable to a post-processing apparatus capable of cutting a sheet, is devised. The image forming apparatus includes a sheet size detector to detect a size of a sheet to be conducted with print processing, a dividing number acquiring unit to acquire a dividing number of the sheet, a sheet divider to divide the sheet into a plurality of areas based on the sheet size detected by the sheet size detector and the dividing number acquired by the dividing number acquiring unit, a security printing setting acquiring unit to acquire setting of a position of security printing, and a security printing position determination unit to determine a print position of security printing on each of the plurality of areas, divided by the sheet divider, based on the position of security printing acquired by the security printing setting acquiring unit.

In another aspect of the present invention, a method of security printing for an image forming apparatus is devised. The method includes the steps of detecting a size of a sheet to be conducted with print processing (sheet size detection step), acquiring a dividing number of the sheet (dividing number acquiring step), dividing the sheet into a plurality of areas based on the sheet size detected at the sheet size detection step and the dividing number acquired at the dividing number acquiring step (sheet dividing step), acquiring a position of security printing (security printing setting acquiring step), and determining a print position of security printing on each of the plurality of areas, divided at the sheet dividing step, based on the position of security printing acquired at the security printing setting acquiring step (security printing position determining step).

In another aspect of the present invention, a non-transitory computer-readable storage medium storing a program that, when executed by a computer having a processing circuitry, causes the computer to execute a method of security printing for an image forming apparatus, is devised. The method includes the steps of detecting a size of a sheet to be conducted with print processing (sheet size detection step), acquiring a dividing number of the sheet (dividing number acquiring step), dividing the sheet into a plurality of areas based on the sheet size detected at the sheet size detection step and the dividing number acquired at the dividing number acquiring step (sheet dividing step), acquiring a position of security printing (security printing setting acquiring step), and determining a print position of security printing on each of the plurality of areas, divided at the sheet dividing step, based on the position of security printing acquired at the security printing setting acquiring step (security printing position determining step).

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 illustrates views of adjustment of stamp positions on sheets depending on dividing numbers;

FIGS. 9A and 9B illustrate views of sheet conveyance patterns and applicability of double punching;

FIGS. 10A and 10B illustrate positional relationships of a print area of stamp and a perforating area of punch hole when double punching is conducted by changing a type of punch unit;

FIG. 12 is a flowchart showing the steps of process of setting conditions for a printing processing and a post-processing of the image forming apparatus of FIG. 1;

Figure 1:
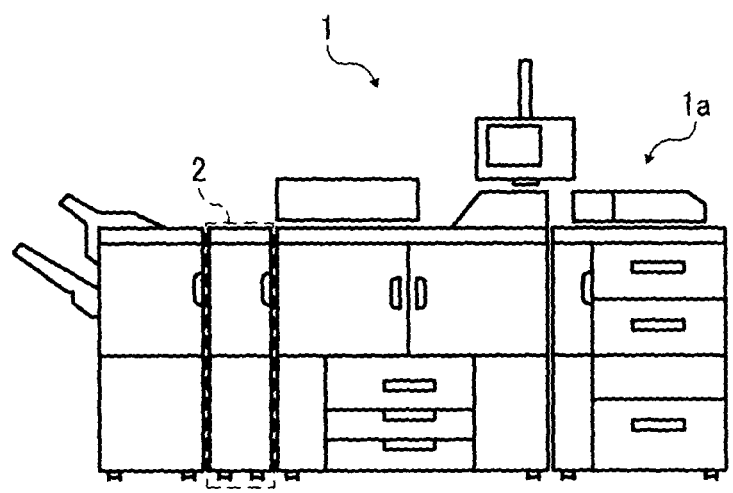
FIG. 1 is a view of an image forming apparatus according to one or more example embodiments connected to a post-processing apparatus.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to example embodiments are described hereinafter.

A description is given of an image forming apparatus according to example embodiments with reference to drawings. FIG. 1 is an overall view of an image forming apparatus 1 connectable to a post-processing apparatus 2, with which double copy and/or double punching can be conducted. Similar to a post-processing apparatus such as a stapler, the post-processing apparatus 2 is connectable to a body 1a of the image forming apparatus 1 at a downstream of a conveyance or transporting direction of sheet, with which a post-processing can be conducted to a sheet after forming an image on the sheet. The post-processing apparatus 2 connectable to the body 1a includes a function of divide-cutting of sheets after double copy and/or double punching is conducted.

The divide-cutting means cutting one sheet into a plurality of sheets at a given dividing position on one sheet depending on a type of post-processing set by a user. For example, when a user sets double copy, the post-processing apparatus 2 cuts one sheet into two sheets at the center of a conveyance or transport direction of the sheet, and when a user sets double punching function, the post-processing apparatus 2 perforates holes at two portions of the one sheet such as at the center and the rear end of the one sheet in a conveyance or transporting direction of the sheet, and cuts the one sheet into two sheets at the center of the conveyance direction of sheet.

The post-processing apparatus 2, which is an example of a peripheral apparatus having double punching capability, includes a punch unit having one or more perforators, and shape and number of the perforators can be changed depending on demands of users. Therefore, different types of punch units can be prepared by changing shape and number of the perforators. Typically, one punch unit is detachably set in the post-processing apparatus 2. When double punching is set, the punch unit conducts punching at two portions of one sheet by positioning the sheet at given positions for two times while conveying the sheet, with which double punching is conducted. Further, to be described later, the post-processing apparatus 2 can detect a type of punch unit set in the post-processing apparatus 2 by using a sensor, and transfers information of the type of punch unit such as information of shape and number of the perforators to the image forming apparatus 1. The perforator is, for example, a punch cutter that can cut through a punch hole on a sheet, and shape and number of the punch cutters can be changed as required.

Figure 2:
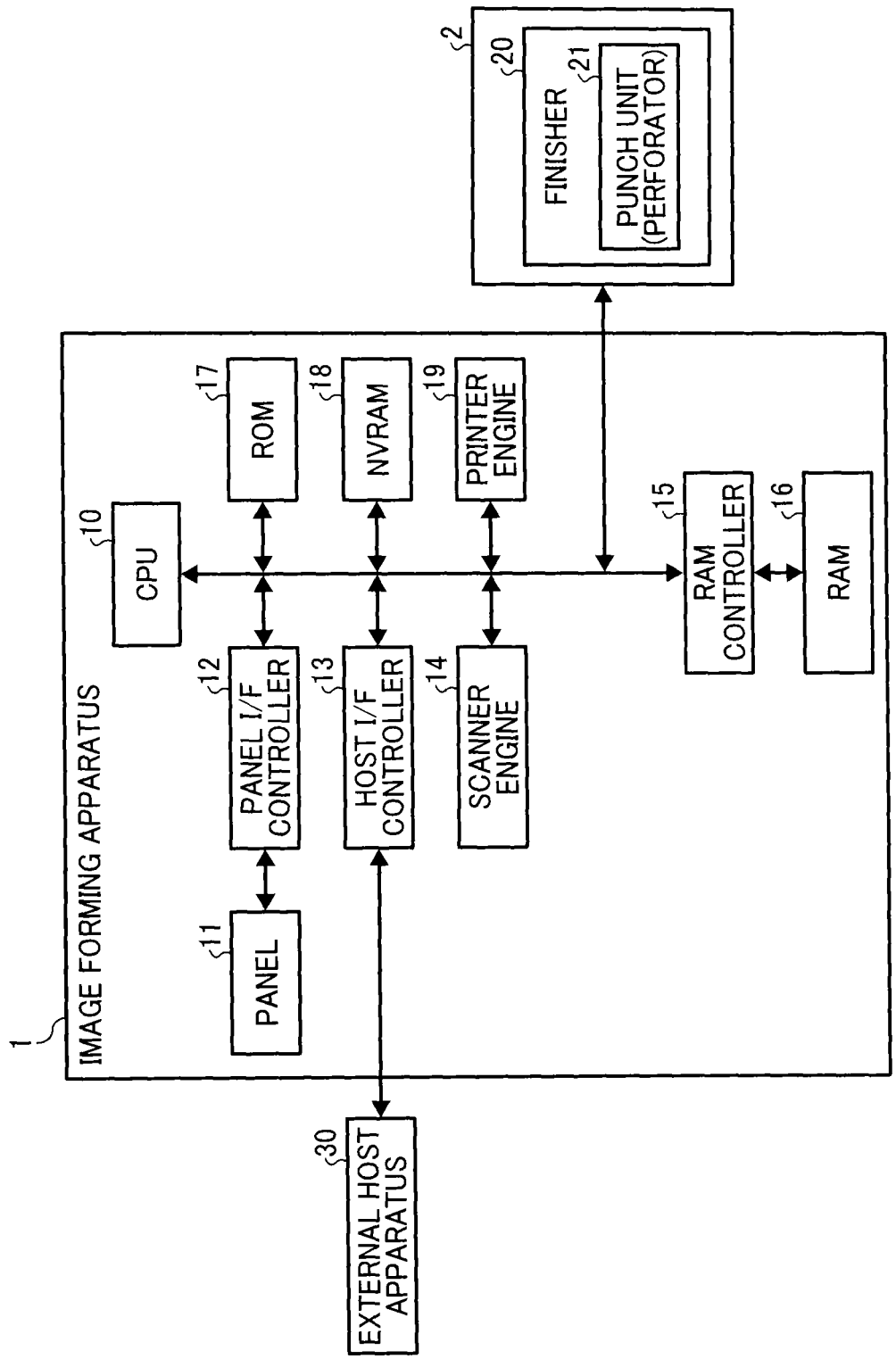
FIG. 2 is a hardware configuration of the image forming apparatus of FIG. 1.

FIG. 2 is a hardware configuration of the image forming apparatus 1. The image forming apparatus 1 includes, for example, a central processing unit (CPU) 10, a panel 11, a panel interface (I/F) controller 12, a host interface controller 13, a scanner engine 14, a random access memory (RAM) controller 15, a RAM 16, a read only memory (ROM) 17, a non-volatile random access memory (NVRAM) 18, and a printer engine 19. The post-processing apparatus 2 includes, for example, a finisher 20 having a punch unit 21.

The CPU 10 is a central processing unit that controls each block of the image forming apparatus 1. The panel 11 is a user interface, which includes buttons for operating the apparatus and indicators for indicating apparatus condition such as light emitting diode (LED) and liquid crystal display (LCD), and a speaker. The panel interface controller 12 controls contents displayed on the panel 11, and reception of contents input or set by a user.

The host interface controller 13 receives print data from an external host apparatus 30 used as an image input unit for printing. The host interface controller 13 uses interface standards such as Institute of Electrical and Electronics Engineers (IEEE) 1284, universal serial bus (USB) for local connection, and wired and wireless Ethernet (registered trademark). The scanner engine 14 is an image input unit for copy and scanning.

The RAM controller 15 controls data writing and reading for the RAM 16. The RAM 16 is a volatile memory that stores data generated by a process at each block temporarily. The ROM 17 stores programs executed by the CPU 10. The NVRAM 18 is a non-volatile memory that stores information such as various parameters set for each apparatus.

The printer engine 19 is a print output unit, in which a print output method of the printer engine 19 is for example, a laser method, a LED method, and an inkjet method. The finisher 20 conducts a post-processing under a control of an engine manager 300 (FIG. 3) to be described later. The engine manager 300 (FIG. 3) controls various processing such as setting a folding line for each sheet when conducting printing and saddle stitch book binding, stapling process, and punching process by the punch unit 21.

Figure 3:
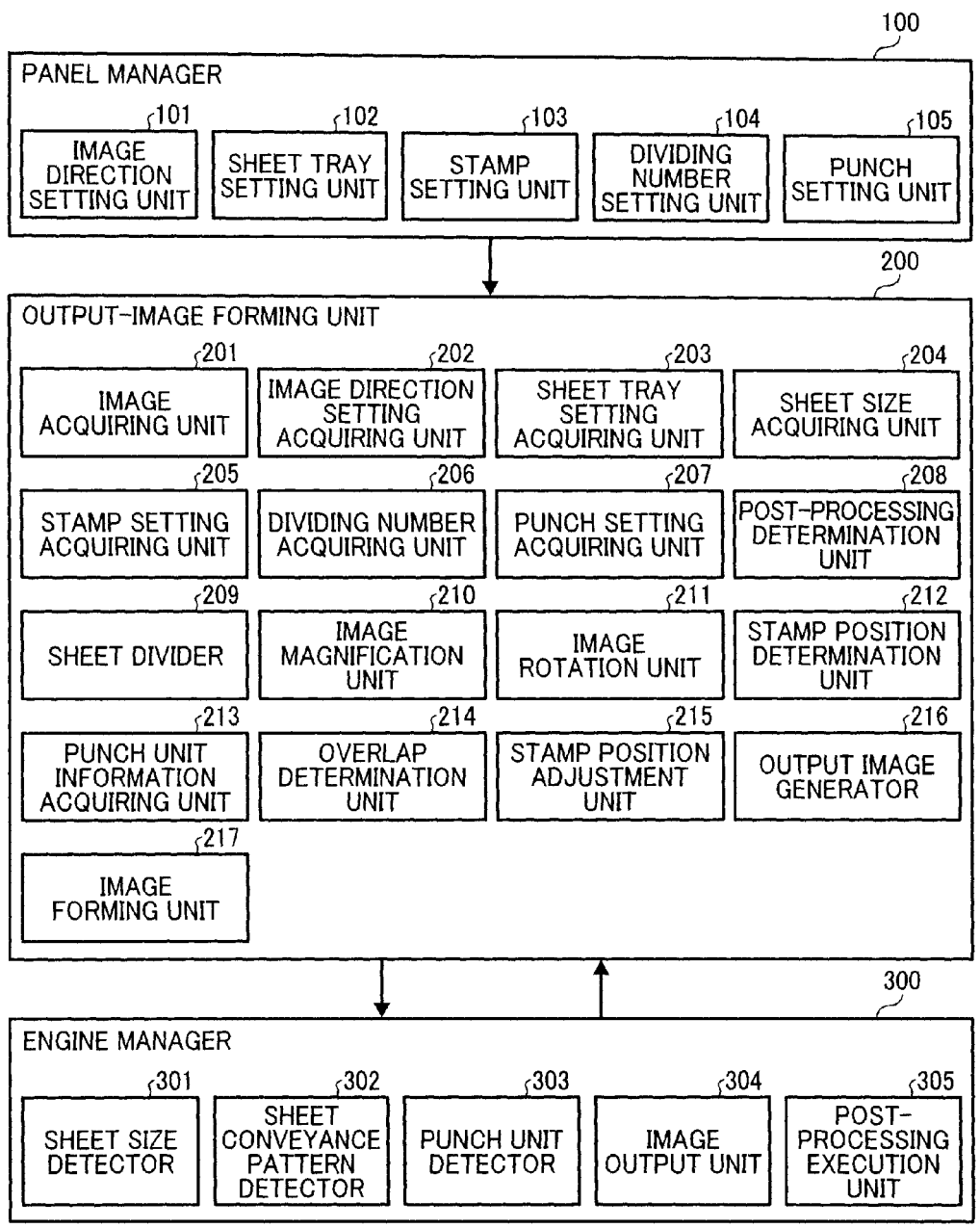
FIG. 3 is a functional configuration of the image forming apparatus of FIG. 1.

FIG. 3 is a functional configuration of the image forming apparatus 1. The image forming apparatus 1 is configured with, for example, a panel manager 100, an output-image forming unit 200, and an engine manager 300. The panel manager 100 is, for example, a user interface (i.e., input operation unit) such as a keyboard, a touch panel or the like. The panel manager 100 is configured with, for example, an image direction setting unit 101, a sheet tray setting unit 102, a stamp setting unit 103, a dividing number setting unit 104, and a punch setting unit 105.

The image direction setting unit 101 can be used as a setting unit for setting an image direction for copying or printing. The image direction and processing by the image direction setting unit 101 will be described later with reference to FIG. 4.

The sheet tray setting unit 102 can be used as a setting unit for setting one or more sheet trays that store sheets to be used for copying or printing. The setting method of sheet tray includes a direct setting method of sheet tray to be used for copying or printing, and an automatic setting method by the image forming apparatus 1. Further, each sheet tray can be related to size of sheets set in the sheet tray. Therefore, by setting a sheet tray, sheets to be used for copying or printing can be set.

The stamp setting unit 103 can be used as a setting unit for setting type, size, and position of stamp. The type of stamp includes, for example, page number printing for printing page number, security printing for printing a user name and/or print date and time for enhancing security, and security printing for printing two dimensional code of matrix type such as Quick Response (QR) code (registered trademark) for enhancing security. The stamp is corresponded to security printing of example embodiments of the present invention. Hereinafter, a two dimensional code of matrix type such as QR code (registered trademark) is used as an example of the stamp corresponded to security printing of example embodiments of the present invention.

The dividing number setting unit 104 can be used as a setting unit for setting a dividing number of sheet when a sheet is to be divided and cut (i.e., divide-cutting) for post-processing. For example, when a use sets a dividing number of "2" by using the dividing number setting unit 104 and copying function is set or selected, the image forming apparatus 1 recognizes that a target process is double copy, and conducts the target process. The configuration of example embodiments of the present invention can be applied to printing based on multiple-dividing of sheet such as quadruple copying, octuple copying or the like. For the simplicity of description, printing by dividing a sheet into two (i.e., double copy) is described as an example of multiple-dividing of sheet.

The punch setting unit 105 can be used as a setting unit for setting a type of punching such as single punching or double punching and punch position. The punch position means a position on a sheet to be perforated with a hole, and a user can set or adjust the punch position in a direction perpendicular to an arrangement direction of punch holes. Further, a user can refer information acquired by a punch unit detector 303 (e.g., information of shape and number of perforators) to be described later when setting the punch position.

The output-image forming unit 200 forms a print-output image based on conditions set by using the panel manager 100. The output-image forming unit 200 is configured with, for example, an image acquiring unit 201, an image direction setting acquiring unit 202, a sheet tray setting acquiring unit 203, a sheet size acquiring unit 204, a stamp setting acquiring unit 205, a dividing number acquiring unit 206, a punch setting acquiring unit 207, a post-processing determination unit 208, a sheet divider 209, an image magnification unit 210, an image rotation unit 211, a stamp position determination unit 212, a punch unit information acquiring unit 213, an overlap determination unit 214, a stamp position adjustment unit 215, an output image generator 216, and an image forming unit 217.

The image acquiring unit 201 acquires a target-print image as image data. The image direction setting acquiring unit 202 acquire information of an image direction set by the image direction setting unit 101. The sheet tray setting acquiring unit 203 acquires information of a sheet tray set by the sheet tray setting unit 102. The sheet size acquiring unit 204 acquires information of a sheet size detected by a sheet size detector 301 to be described later.

The stamp setting acquiring unit 205 acquires information of type, size, and position of stamp set by the stamp setting unit 103. In example embodiments, the stamp setting acquiring unit 205 can be used as a security printing setting acquiring unit.

The dividing number acquiring unit 206 acquires a dividing number of sheet set by the dividing number setting unit 104. The punch setting acquiring unit 207 acquires information of type and position of punching set by the punch setting unit 105.

The post-processing determination unit 208 determines contents of post-processing such as double copy, double punching, single punching, and standard printing based on the dividing number acquired by the dividing number acquiring unit 206, and the type of punching acquired by the punch setting acquiring unit 207.

The sheet divider 209 divides a sheet into a given areas based on the dividing number acquired by the dividing number acquiring unit 206, and/or type of punching (e.g., double punching) acquired by the punch setting acquiring unit 207.

The image magnification unit 210 conducts magnification processing as required based on an image size acquired by the image acquiring unit 201, and a sheet size acquired by the sheet size acquiring unit 204. When an image is to be printed on each of divided areas, prepared by dividing one sheet into a plurality of areas (i.e., when double copy or double punching is set), the image magnification unit 210 conducts magnification processing so that the image can be printed within each of divided areas.

The image rotation unit 211 rotates an image based on an image direction acquired by the image direction setting acquiring unit 202. When the image rotation unit 211 rotates the image for a given angle, the image rotation unit 211 also rotates a stamp for the same given angle.

The stamp position determination unit 212 determines a print position of stamp based on a stamp position acquired by the stamp setting acquiring unit 205. The stamp position determination unit 212 can be used as a security printing position determination unit.

The punch unit information acquiring unit 213 acquires information of a punch unit connected to the image forming apparatus 1 as the post-processing apparatus 2. Specifically, the punch unit information acquiring unit 213 acquires information of shape and number of perforators of the punch unit detected by the punch unit detector 303 to be described later.

The overlap determination unit 214 determines whether a print area of stamp and a perforating area of punch hole overlap based on type, size, and position of stamp acquired by the stamp setting acquiring unit 205, and information of shape and number of perforators of the punch unit acquired by the punch unit information acquiring unit 213. When the overlap determination unit 214 determines that the print area of stamp and the perforating area of punch hole overlap, the stamp position adjustment unit 215 adjusts the print area of stamp so that the print area of stamp does not overlap the perforating area of punch hole.

The output image generator 216 layouts an image acquired by the acquiring unit 201, and a stamp set by the stamp setting unit 103 on a target print area to generate a print-output image. The image forming unit 217 forms an image based on the print-output image generated by the output image generator 216.

The engine manager 300 mainly conducts a printing processing, and a post-processing. The engine manager 300 is configured with, for example, a sheet size detector 301, a sheet conveyance pattern detector 302, a punch unit detector 303, an image output unit 304, and a post-processing execution unit 305.

The sheet size detector 301 detects a sheet size related to a sheet tray based on information of the sheet tray acquired by the sheet tray setting acquiring unit 203. The sheet conveyance pattern detector 302 detects a sheet conveyance pattern based on a sheet stetting condition. Further, the sheet size detector 301 transfers the detected sheet size to the output-image forming unit 200. The sheet conveyance pattern detector 302 transfers the detected sheet conveyance pattern to the output-image forming unit 200. The sheet conveyance pattern will be described later with reference to FIG. 9. For example, size of sheets set in a sheet tray can be detected using a sensor such as a sheet guide, in which when sheets are set in the tray and the sheet guide is contacted to the end of sheets stacked in the tray, a sheet size can be detected.

The punch unit detector 303 detects a type of punch unit based on the punch unit connected as the post-processing apparatus 2. The punch unit detector 303 transfers information of the detected punch unit (i.e., information of shape and number of perforators) to the output image generator 216. In this case, information transferred from the punch unit detector 303 to the output-image forming unit 200 can be a model number of the punch unit alone, in which the output-image forming unit 200 can acquire information of shape and number of perforators based on the transferred model number of the punch unit.

The image output unit 304 print-outputs the image formed by the image forming unit 217 on a sheet. The post-processing execution unit 305 executes a post-processing such as double copy or double punching to the sheet having printed with the image by the image output unit 304.

Figure 4:
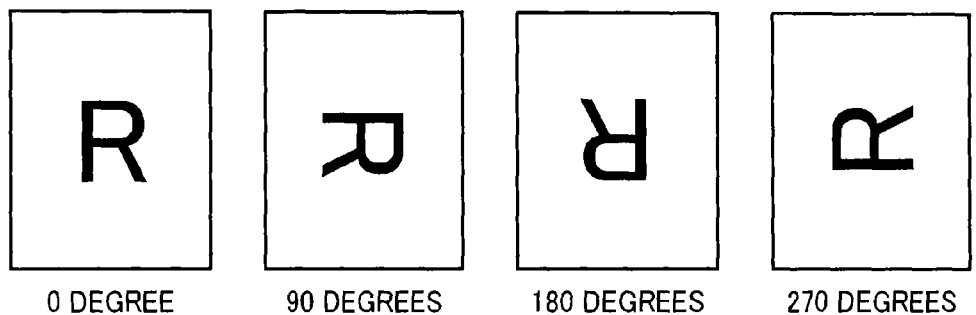
FIG. 4 illustrates views of image directions settable by an image direction setting unit.

FIG. 4 illustrates views of image directions settable by the image direction setting unit 101. A user can set an image direction by using the image direction setting unit 101 based on an image scanned by a scanner of the image forming apparatus 1 or an image loaded on a memory when the image is input from an external device such as a printer driver. Specifically, a user can set an image direction from four directions such as 0, 90, 180, and 270 degrees by using the image direction setting unit 101 as illustrated in FIG. 4, in which the image direction for printed sheet can be set from four directions with a 90-degree interval such as 0 degree, 90 degrees, 180 degrees, and 270 degrees. When a copying operation is conducted by reading document image by a scanner of the image forming apparatus 1, the image direction setting unit 101 can recognize or set an image direction based on a document direction set to a document feeder (DF) or a pressure plate by a user.

Figure 5A:
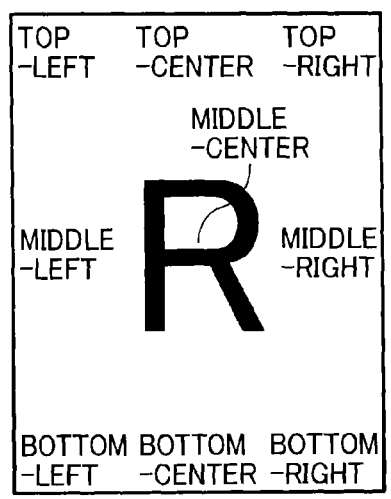
FIGS. 5A and 5B illustrate views of stamp positions settable by a stamp setting unit.

FIG. 5 illustrates views of stamp positions settable by the stamp setting unit 103. As illustrated in FIG. 5A, a user can select or set a stamp position from nine positions such as top-left, top-center, top-right, middle-left, middle-center, middle-right, bottom-left, bottom-center, and bottom-right by using the stamp setting unit 103. The reference or standard stamp position is set at an image direction of 0 degree. Therefore, when an image direction is set other than 0 degree, a stamp position is adjusted depending on the set image direction, which means the image rotation unit 211 rotates a stamp position matched to the set image direction, and the stamp position determination unit 212 determines a stamp position for the image forming apparatus 1.

Figure 5B:
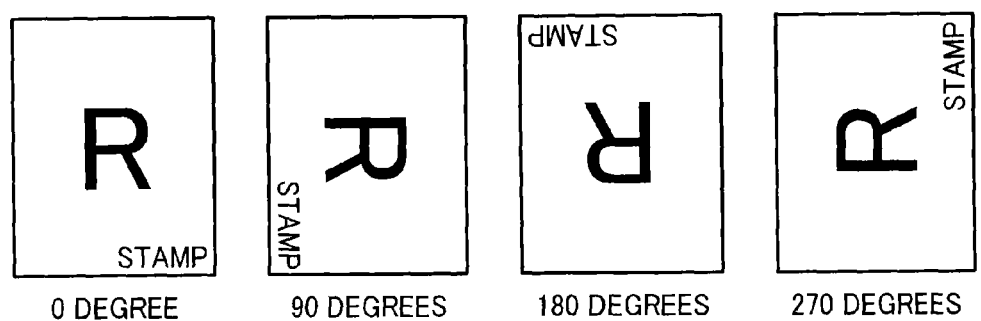

FIG. 5B illustrates views of sheets when the image direction setting unit 101 sets an image direction from 0 degree, 90 degrees, 180 degrees, and 270 degrees, in which the stamp setting unit 103 sets a stamp position, for example, at the bottom-right of the sheet. As illustrated in FIG. 5B, the stamp position is adjusted based on the image direction.

FIG. 6 illustrates views of adjustment of stamp positions on sheets depending on different dividing numbers. FIG. 6 illustrates a case of printing without dividing a sheet, a case of printing by dividing a sheet into two areas, and a case of printing by dividing a sheet into four areas, in which the stamp setting unit 103 sets a stamp position, for example, at the bottom-right of the sheet.

As to the image forming apparatus 1, based on whether a sheet dividing operation is to be conducted or not and a dividing number of sheet, a stamp size is changed by the image magnification unit 210, and a stamp is rotated by the image rotation unit 211. Then, the stamp position determination unit 212 determines a stamp position.

As illustrated in FIG. 6, when a printing operation by the image forming apparatus 1 is to be conducted by dividing a sheet into two areas, an image size is reduced by the image magnification unit 210, and the size-reduced image is layout on the sheet by rotating the size-reduced image for 90 degrees by using the image rotation unit 211. Therefore, a stamp size is changed by the image magnification unit 210, and the stamp is rotated for 90 degrees by the image rotation unit 211 in line with the size-reduced image, and then the stamp position determination unit 212 sets a position of the stamp at the bottom-right of each image area.

Further, when a printing operation by the image forming apparatus 1 is to be conducted by dividing a sheet into four areas, an image is not required to be rotated by the image rotation unit 211, in which a stamp size is changed by the image magnification unit 210 in line with the size-reduced image, and then the stamp position determination unit 212 sets a position of the stamp at the bottom-right of each image area.

Figure 7:
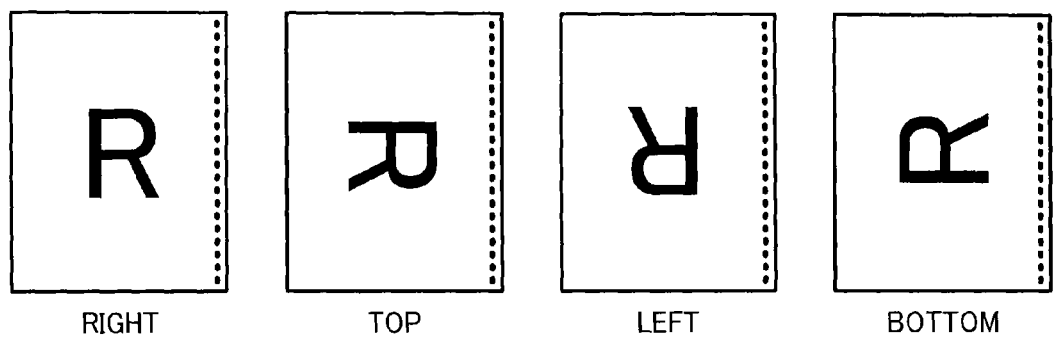
FIG. 7 illustrates views indicating relationship of image directions and punch positions.

FIG. 7 illustrates views indicating a relationship of image directions and punch positions. FIG. 7 illustrates punching process when the image direction is set or rotated to 0 degree, 90 degrees, 180 degrees, and 270 degrees. The punching direction (i.e. arrangement direction of punch holes) is physically limited due to a mechanical configuration (i.e., designed configuration) of a punch unit. Therefore, when a user conducts a punching process at a desired position (or direction) of an image, the image is required to be rotated to set an image direction at a desired direction as illustrated in FIG. 7.

Figure 8:
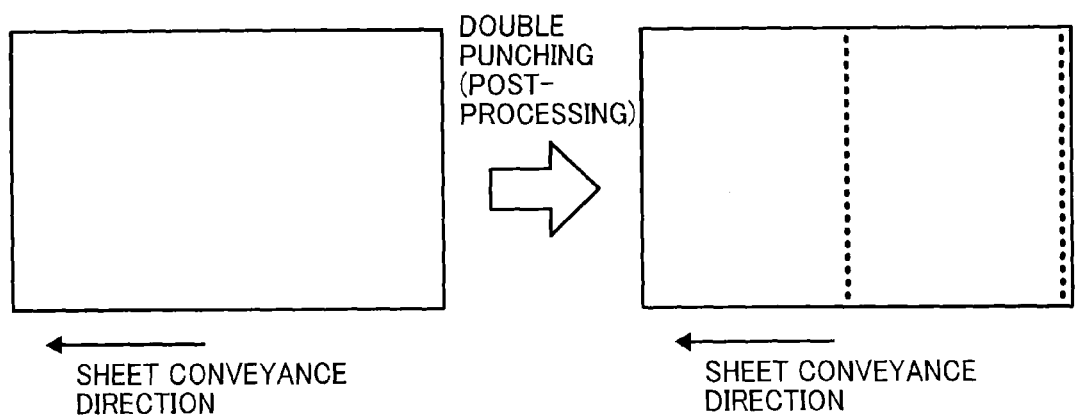
FIG. 8 illustrates double punching position when double punching processing is conducted to a sheet.

FIG. 8 illustrates double punching position (i.e., perforating area of double punching) when double punching is conducted to a sheet. When the double punching is set, the post-processing execution unit 305 conducts a punching process at a middle (i.e., center) position and a rear end position of a sheet with respect to a sheet conveyance direction as illustrated in FIG. 8.

FIG. 9 illustrates views of sheet conveyance patterns and applicability of double punching. As illustrated in FIG. 9A, the sheet conveyance pattern includes a long edge feed (LEF) and a short edge feed (SEF). As to the long edge feed (LEF), a sheet is conveyed by setting a longer side of the sheet in a direction perpendicular to the sheet conveyance direction. As to the short edge feed (SEF), a sheet is conveyed by setting a shorter side of the sheet in a direction perpendicular to the sheet conveyance direction.

If the sheet conveyance pattern detector 302 detects that the sheet conveyance pattern is SEF, the post-processing execution unit 305 does not conduct double punching even if a user sets the double punching. When a sheet is divided into two areas and conveyed by the sheet conveyance pattern of SEF, a punching process is to be conducted to a target-print image as illustrated in FIG. 9B because the punching direction of the punch unit is limited due to the mechanical configuration of the punch unit, which means punch holes overlap with an image printed on the sheet as illustrated in FIG. 9B.

By contrast, the single punching can be conducted for both of the sheet conveyance patterns of LEF and SEF without overlapping punch holes with an image printed on the sheet.

FIG. 10 illustrates positional relationships of a print area of stamp and a perforating area of punch hole when double punching is conducted by changing a type of punch unit. FIG. 10 illustrates two cases when a user sets double punching and a stamp position at the bottom-right. FIG. 10A illustrates a case that a punch unit has two perforators, and FIG. 10B illustrates a case that a punch unit has a number of perforators.

As illustrated in FIG. 10, depending on the number of perforators of a punch unit, the print area of stamp and the perforating area of punch hole do not overlap (FIG. 10A), or do overlap (FIG. 10B). Therefore, when the overlap determination unit 214 is to determine whether the print area of stamp and perforating area of punch hole overlap, the overlap determination unit 214 needs to acquire information of a type of punch unit (i.e., shape and number of perforators). By acquiring information of the type of punch unit in advance, an overlapping determination can be conducted with enhanced precision.

Figure 11A:
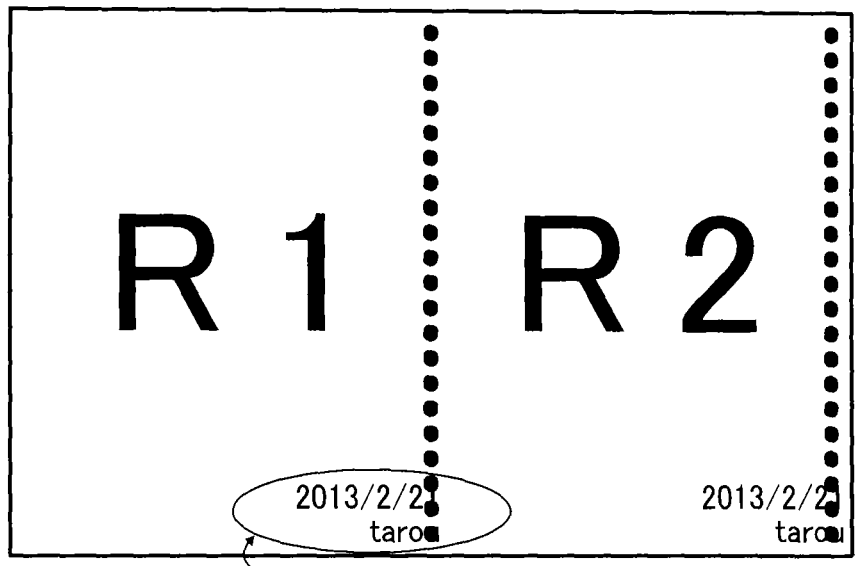
FIGS. 11A and 11B illustrate positional relationships of a print area of stamp and a perforating area of double punching when the print area of stamp and the perforating area of double punching overlap, and the print area of stamp is adjusted to avoid overlapping.
Figure 11B:
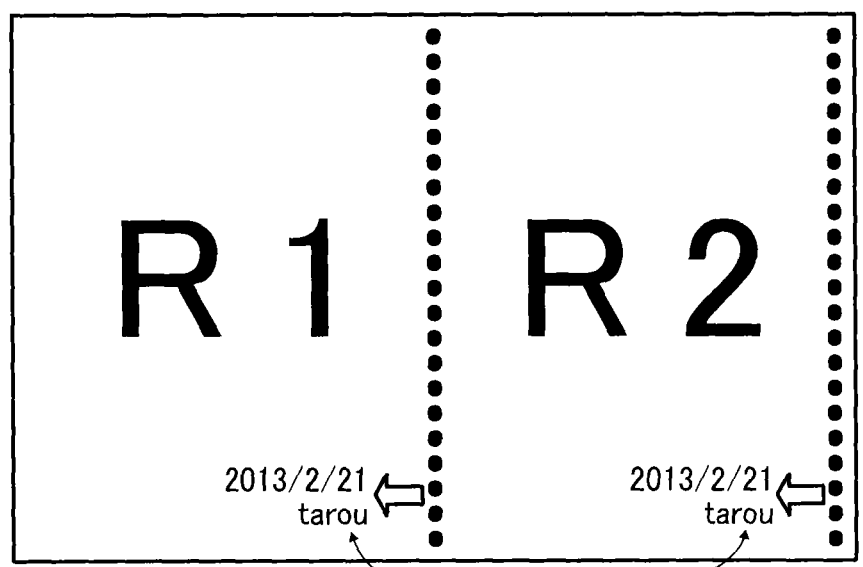

FIG. 11 illustrates positional relationships of a print area of stamp and a perforating area of double punching when the print area of stamp and the perforating area of double punching overlap, and then the print area of stamp is adjusted or shifted to avoid the overlapping. FIG. 11A illustrates a case that the print area of stamp and the perforating area of double punching overlap, in which a part of the stamp is missing. In this case, when the overlap determination unit 214 confirms the overlapping, the stamp position adjustment unit 215 adjusts a stamp position (i.e., print area of stamp) so that the last part of the stamp does not overlap the perforating area of punch hole as illustrated in FIG. 11B.

A description is given of steps of setting of conditions for a printing processing and a post-processing of the image forming apparatus 1 with reference to FIG. 12.

FIG. 12 is a flowchart showing the steps of process of setting conditions for a printing processing and a post-processing of the image forming apparatus 1. A user selects an image direction of a target-print image from 0 degree, 90 degrees, 180 degrees, and 270 degrees, and sets the image direction of the target-print image (S101). The user sets a sheet tray to be used for printing (S102).

The user sets a stamp (S103). For example, the user selects a to-be-printed stamp based on a type of stamp such as page number, user name, print data/time, and QR code (registered trademark), and sets a size and position of the selected stamp (S103).

The user sets a dividing number of one sheet depending on a type of printing operation such as double copy (S104), in which the dividing number is used how one sheet is to be divided into a plurality of areas. Specifically, the user can set the dividing number of two (two-images-in-one sheet), four (four-images-in-one sheet), and eight (eight-images-in-one sheet), or the like. The user selects a type of punching (e.g., single punching or double punching), and sets a punch position (S105) as punching condition. Based on the settings of S101 to S105, the image forming apparatus 1 recognizes contents of a print processing and a post-processing, and executes the print processing and the post-processing.

Figure 13A:
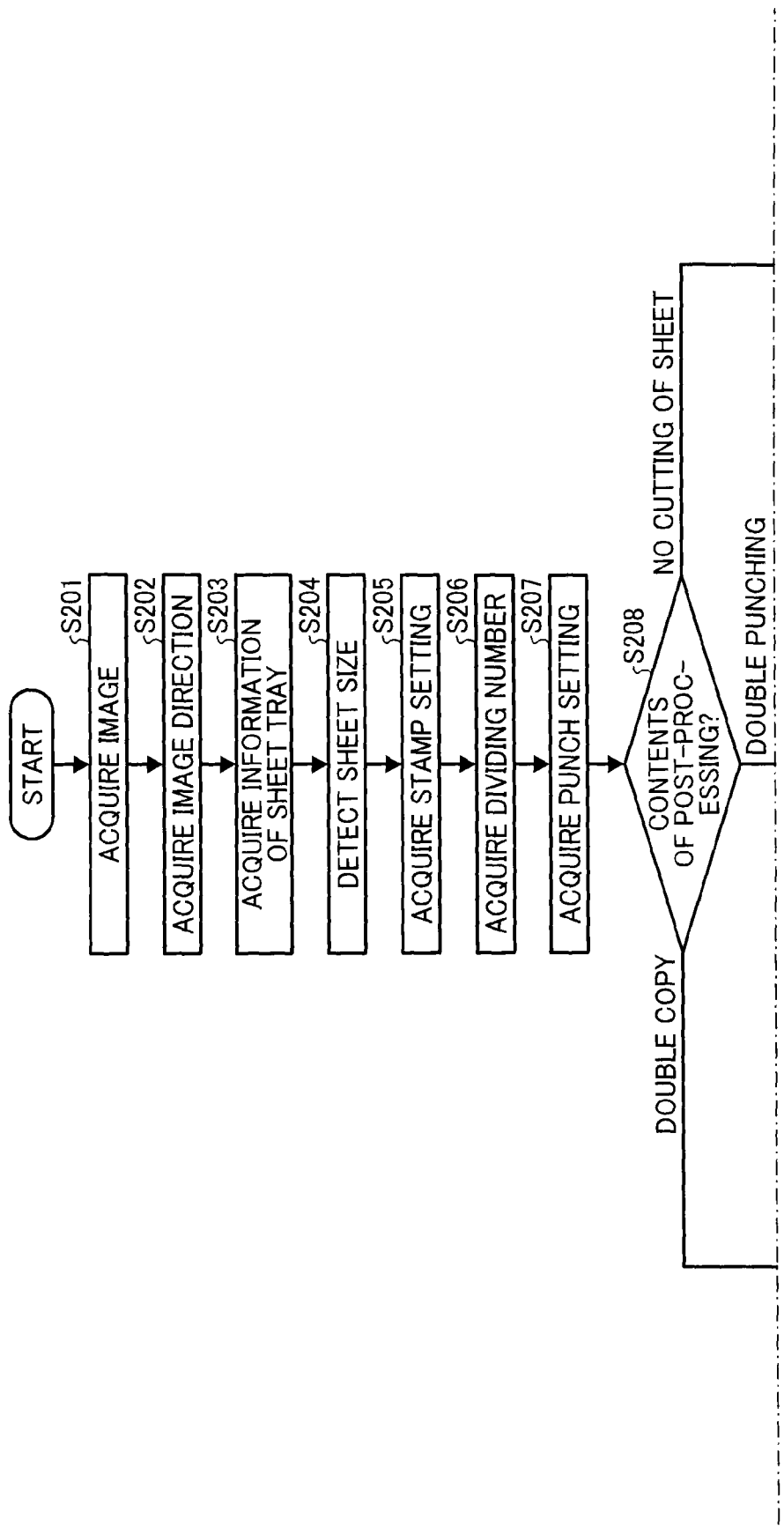
FIGS. 13A, 13B, and 13C are a flowchart showing the steps of print processing and post-processing of the image forming apparatus 1 of FIG. 1.
Figure 13B:
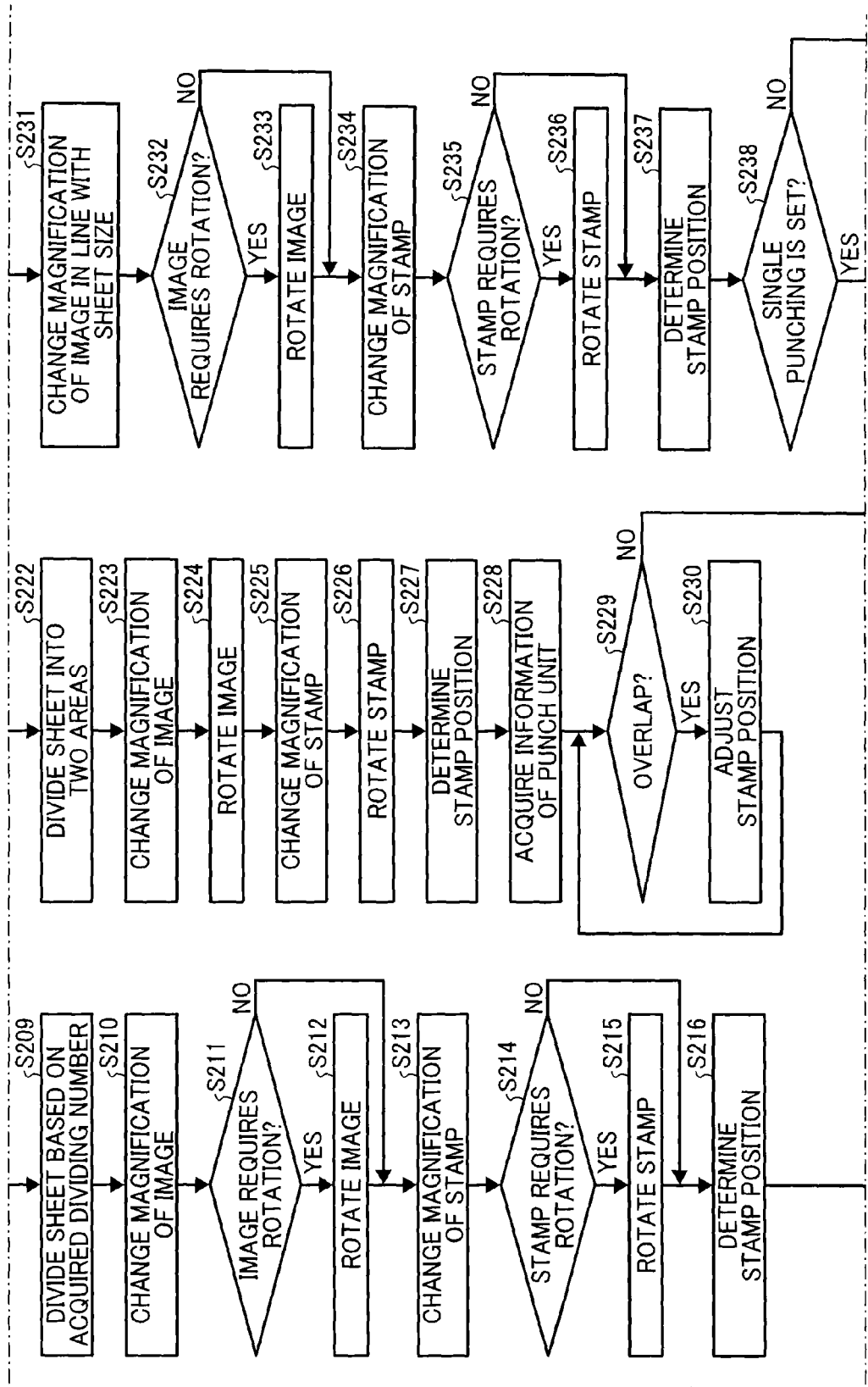
Figure 13C:
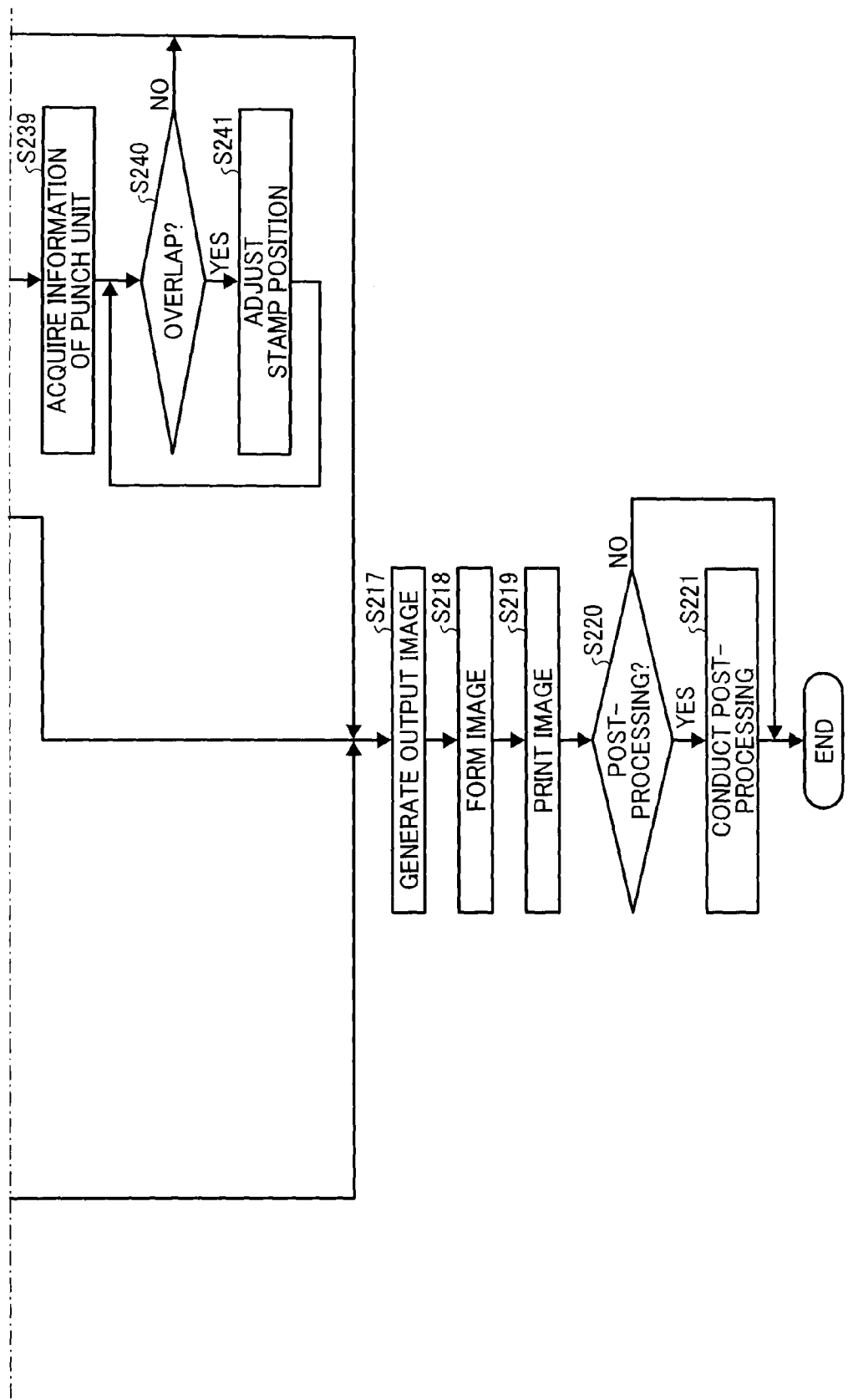

FIG. 13 is a flowchart showing the steps of a print processing and a post-processing of the image forming apparatus 1, in which processes for setting and printing of stamp is assumed to be conducted.

When the print processing of FIG. 13 is started, the image acquiring unit 201 acquires a target-print image as image data (S201). The image direction setting acquiring unit 202 acquires information of an image direction set by the image direction setting unit 101 (S202).

The sheet tray setting acquiring unit 203 acquires information of a sheet tray set by the sheet tray setting unit 102 (S203). The sheet size detector 301 detects a sheet size based on information of the sheet tray acquired by the sheet tray setting acquiring unit 203 (S204).

The stamp setting acquiring unit 205 acquires information of type, size, and position of a stamp set by the stamp setting unit 103 (S205). The dividing number acquiring unit 206 acquires a dividing number of sheet set by the dividing number setting unit 104 (S206). The punch setting acquiring unit 207 acquires information of type and position of punching set by the punch setting unit 105 (S207).

The post-processing determination unit 208 determines contents of a post-processing based on information acquired by the dividing number acquiring unit 206 and the punch setting acquiring unit 207 (S208). For example, the post-processing determination unit 208 determines or classifies a post-processing from a plurality of post-processing such as three types of post-processing including double copy, double punching, and no processing of double copy and double punching (i.e., sheet is not cut at the post-processing such as when a single punching is conducted).

When the determination unit 208 determines that the post-processing is double copy (S208: double copy), the sheet divider 209 divides a sheet into a plurality of areas based on the dividing number acquired by the dividing number acquiring unit 206 (S209).

The image magnification unit 210 conducts magnification change of image so that the image acquired by the image acquiring unit 201 can be printed within each of areas divided by the sheet divider 209 (S210).

The image rotation unit 211 determines whether the image is required to be rotated based on the image direction (i.e., 0 degree, 90 degrees, 180 degrees, 270 degrees) acquired by the image direction setting acquiring unit 202, and the dividing number acquired by the dividing number acquiring unit 206 (S211). When the image rotation unit 211 determines that the image is required to be rotated (S211: Yes), the image rotation unit 211 rotates the image (S212).

The image magnification unit 210 changes magnification of the stamp with the same magnification rate of the image (S213). Further, if the image is rotated at step S212, the image rotation unit 211 determines that the stamp is also required to be rotated (S214: Yes), and rotates the stamp (S215). The stamp position determination unit 212 determines a print position of stamp based on a stamp position acquired by the stamp setting acquiring unit 205 (S216).

The output image generator 216 layouts the image and the stamp on each of areas on the sheet prepared by dividing the sheet by the sheet divider 209 to generate a print-output image (S217). The image forming unit 217 forms an image based on the print-output image generated by the output image generator 216 (S218). The image output unit 304 print-outputs the image formed by the image forming unit 217 on a sheet (S219). The post-processing execution unit 305 determines that a post-processing is required to be conducted based on information acquired by the dividing number acquiring unit 206 (S220: Yes), and cuts the sheet based on the dividing number acquired by the dividing number acquiring unit 206 (S221).

Further, if the post-processing determination unit 208 determines that the post-processing is double punching (S208: double punching), the sheet divider 209 divides a sheet into two areas (S222). When determining the post-processing at step S208, information detected by the sheet conveyance pattern detector 302 is also referred. As described with reference to FIG. 9, even if a user sets double punching by using the punch setting unit 105, when the sheet conveyance pattern detector 302 detects the sheet conveyance pattern of "SEF", the post-processing determination unit 208 does not proceed the process to the double punching.

The image magnification unit 210 changes magnification of the image so that the image acquired by the image acquiring unit 201 can be printed within each of two areas divided by the sheet divider 209 (S223). The image rotation unit 211 rotates the image based on the image direction acquired by the image direction setting acquiring unit 202 (S224).

The image magnification unit 210 changes magnification of the stamp with the same magnification rate applied to the image (S225). The image rotation unit 211 rotates the stamp in a direction same as the image direction (S226). The stamp position determination unit 212 determines a print position of stamp based on the stamp position acquired by the stamp setting acquiring unit 205 (S227).

The punch unit information acquiring unit 213 acquires shape and number of perforators of the punch unit from the punch unit detector 303 (S228).

The overlap determination unit 214 determines whether a print area of stamp and a perforating area of punch hole overlap based on type, size, and position of the stamp acquired by the stamp setting acquiring unit 205, and shape and number of the perforators of the punch unit acquired by the punch unit information acquiring unit 213 (S229).

When the overlap determination unit 214 determines that the print area of stamp and the perforating area of punch hole overlap (S229: Yes), the stamp position adjustment unit 215 adjusts the stamp position such that the print area of stamp and the perforating area of punch hole do not overlap (S230). After adjusting the stamp position at step S230, the overlap determination unit 214 determines again whether the print area of stamp and the perforating area of punch hole overlap based on the adjusted stamp position (S229). The overlapping determination process at step S229 and the stamp position adjustment process at step S230 are conducted repeatedly until it is determined that the print area of stamp and the perforating area of punch hole do not overlap.

When the overlap determination unit 214 determines that the print area of stamp and the perforating area of punch hole do not overlap at step S229 (S229: No), the process proceeds to a generation process of an output image. The process of determining whether a print area of stamp and a perforating area of punch hole overlap, and the process of a stamp position adjustment when the overlapping occurs will be described later with reference to FIG. 14.

The output image generator 216 layouts the image and the stamp on each of the areas, which is divided into two areas, to generate a print-output image (S217). The image forming unit 217 forms an image based on the print-output image generated by the output image generator 216 (S218). The image output unit 304 print-outputs the image formed by the image forming unit 217 on a sheet (S219). The post-processing execution unit 305 determines that a post-processing is required to be conducted based on information acquired by the punch setting acquiring unit 207 (S220: Yes) and conducts double punching as the post-processing, and then cuts the sheet into two sheets (S221).

Further, when the post-processing determination unit 208 determines that none of double copy and double punching is conducted as the post-processing (i.e., no cutting of sheet), the image magnification unit 210 changes magnification of the image in line with the sheet size (S231). Further, when the image rotation unit 211 determines that the image is required to be rotated based on the image direction acquired by the image direction setting acquiring unit 202 (S232: Yes), the image rotation unit 211 rotates the image (S233).

The image magnification unit 210 changes magnification of the stamp with the same magnification rate applied to the image (S234). Further, if the image is rotated at step S233, the image rotation unit 211 determines that the stamp is also required to be rotated (S235: Yes), and rotates the stamp in the same direction of the image (S236). The stamp position determination unit 212 determines a print position of stamp based on the stamp position acquired by the stamp setting acquiring unit 205 (S237).

If the user sets single punching (S238: Yes), the punch unit information acquiring unit 213 acquires information of shape and number of perforators of a punch unit (S239). Further, if the user does not set single punching (S238: No), the image forming apparatus 1 proceeds the process to a generation process of an output image (S217).

The overlap determination unit 214 determines whether a print area of stamp and a perforating area of punch hole overlap based on type, size, and position of the stamp acquired by the stamp setting acquiring unit 205, and shape and number of the perforators of the punch unit acquired by the punch unit information acquiring unit 213 (S240).

When the overlap determination unit 214 determines that the print area of stamp and the perforating area of punch hole overlap (S240: Yes), the stamp position adjustment unit 215 adjusts the stamp position such that the print area of stamp and the perforating area of punch hole do not overlap (S241). The overlap determination unit 214 determines again whether the print area of stamp and the perforating area of punch hole overlap based on the stamp position adjusted by the stamp position adjustment unit 215 (S240). The overlapping determination process at step S240 and the stamp position adjustment process at step S241 are conducted repeatedly until the overlap determination unit 214 determines that the print area of stamp and the perforating area of punch hole do not overlap at step S240.

When the overlap determination unit 214 determines that the print area of stamp and the perforating area of punch hole do not overlap at step S240 (S240: No), the process proceeds to a generation process of an output image. The output image generator 216 layouts the image and the stamp to generate a print-output image (S217). The image forming unit 217 forms an image based on the print-output image generated by the output image generator 216 (S218).

The image output unit 304 print-outputs the image formed by the image forming unit 217 on a sheet (S219). If single punching is set as a post-processing (S220: Yes), the post-processing execution unit 305 conducts the single punching (S221). If a user does not set a post-processing (S220: No), the image forming apparatus 1 ends the process without conducting the post-processing.

Figure 14:
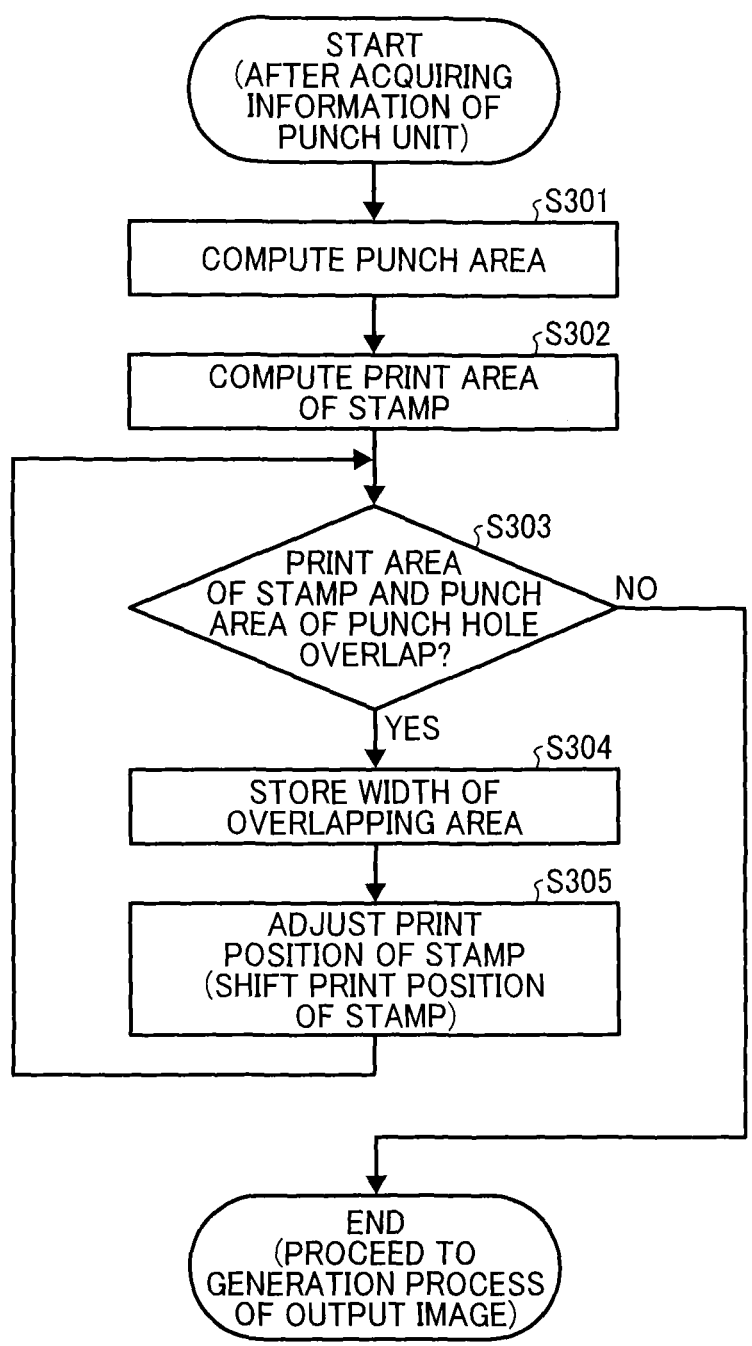
FIG. 14 is a flowchart showing the steps of process of adjusting a stamp position when a print area of stamp and a perforating area of punch hole overlap.

FIG. 14 is a flowchart showing the steps of process of adjusting a stamp position when a print area of stamp and a perforating area of punch hole overlap. The overlap determination unit 214 computes an area used for punching holes (i.e., perforating area) based on a position acquired by the punch setting acquiring unit 207, and shape and number of perforators of a punch unit acquired by the punch unit information acquiring unit 213 (S301).

Then, the overlap determination unit 214 computes a print area of stamp based on type, size, and position of a stamp acquired by the stamp setting acquiring unit 205 (S302). The overlap determination unit 214 determines whether the print area of stamp and the perforating area of punch hole overlap (S303). Further, when the overlap determination unit 214 determines that the print area of stamp and the perforating area of punch hole overlap (S303: Yes), a width of overlapping area computed at the overlapping determination process is stored in a memory (S304).

Based on the width of overlapping area stored at step S304, the stamp position adjustment unit 215 adjusts a print position of stamp (S305), in which the stamp position adjustment unit 215 shifts the print position of stamp to a position not overlapping with the width of overlapping area so that the print area of stamp and the perforating area of punch hole do not overlap. After adjusting the print position of stamp (S305), the stamp position adjustment unit 215 returns the process to the overlapping determination process by the overlap determination unit 214 at step S303.

When the overlap determination unit 214 determines that that the print area of stamp and the perforating area of punch hole do not overlap (S303: No), the stamp position adjustment process is ended (i.e., proceed the process to a generation process of an output image by the output image generator 216). In the print-output operation, the print position (or print area) of stamp can be shifted by changing a relative position of a sheet and a printing unit such as the image output unit 304.

As to the above described image forming apparatus according to one or more example embodiments, when a security printing function and a post-processing such as divide-cutting of one sheet is combined, even if the one sheet is cut, the security printing function can be maintained on each divide-cut sheet.

In the above described example embodiments, a user conducts setting and instructs execution of printing and post-processing using a user interface of an image forming apparatus, but the setting and execution method is not limited hereto. For example, an image forming apparatus can be connected to a personal computer (PC) installed with software (i.e., a printer driver) useable for controlling the image forming apparatus via a local area network (LAN) cable to configure a network environment such as an intranet, in which a user can set and instruct execution of printing and post-processing using the PC. Further, an image processing unit can be installed with a function of cloud computing, in which a user can set and instruct execution of printing and post-processing from an external device connected to the Internet as a cloud system (cloud computing).

The present invention can be implemented in any convenient form, for example using dedicated hardware, or a mixture of dedicated hardware and software.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The illustrated server apparatuses are only illustrative of one of several computing environments for implementing the embodiments disclosed herein. For example, in some embodiments, any one of the information processing apparatus and the relay apparatus may include a plurality of computing devices, e.g., a server cluster, that are configured to communicate with each other over any type of communication links, including a network, a shared memory, etc. to collectively perform the processes disclosed herein.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus having security printing function, connectable to a post-processing apparatus capable of cutting a sheet, the image forming apparatus comprising:
a sheet size detector to detect a size of a sheet to be conducted with print processing;
a dividing number acquiring unit to acquire a dividing number of the sheet;

a sheet divider to divide the sheet into a plurality of areas based on the sheet size detected by the sheet size detector and the dividing number acquired by the dividing number acquiring unit;

a security printing setting acquiring unit to acquire setting of a position of security printing;

a security printing position determination unit to determine a print position of security printing on each of the plurality of areas, divided by the sheet divider, based on the position of security printing acquired by the security printing setting acquiring unit;

an image magnification unit to change magnification of a size of a target-print image and a size of security printing based on the sheet size detected by the sheet size detector and the dividing number acquired by the dividing number acquiring unit;

an image direction setting acquiring unit to acquire setting of an image direction of the target-print image; and an image rotation unit to rotate the target-print image and the security printing with a given angle based on the image direction acquired by the image direction setting acquiring unit and the dividing number acquired by the dividing number acquiring unit, wherein the post-processing apparatus includes a punch unit having a plurality of perforators for perforating holes at the center and one end of the one sheet in a conveyance direction of the sheet, wherein the image forming apparatus further comprises;

a punch unit information acquiring unit to acquire information of shape and number of the perforators of the punch unit;

an overlapping determination unit to determine whether a print area of the security printing and a perforating area of double punching by the punch unit overlap based on security printing position acquired by the security printing setting acquiring unit and the shape and number of the perforators acquired by the punch unit information acquiring unit;

a security printing position adjustment unit to adjust a print position of security printing to avoid overlapping of the print area of the security printing and the perforating area of the double punching when the overlapping determination unit determines that the print area of the security printing and the perforating area of the double punching overlap; and a printer engine to perform printing of the security printing at the print position which has been adjusted.

2. A method of security printing for an image forming apparatus connected to a post processing apparatus, comprising the steps of:

detecting a size of a sheet to be conducted with print processing;

acquiring a dividing number of the sheet;

dividing the sheet into a plurality of areas based on the sheet size detected at the sheet size detection step and the dividing number acquired at the dividing number acquiring step;

acquiring a position of security printing; and determining a print position of security printing on each of the plurality of areas, divided at the sheet dividing step, based on the position of security printing acquired at the security printing setting acquiring step;

changing magnification of a size of a target-print image and a size of security printing based on the sheet size which has been detected and the dividing number which has been acquired;

acquiring a setting of an image direction of the target-print image; and rotating the target-print image and the security printing with a given angle based on the image direction which has been acquired and the dividing number which has been acquired, wherein the post-processing apparatus includes a punch unit having a plurality of perforators for perforating holes at the center and one end of the one sheet in a conveyance direction of the sheet, wherein the method further comprises:

acquiring information of a shape and a number of perforators of the punch unit;

determining whether a print area of the security printing and a perforating area of double punching by the punch unit overlap based on security printing position which has been acquired and the shape and number of the perforators which has been acquired;

adjusting a print position of security printing to avoid overlapping of the print area of the security printing and the perforating area of the double punching when the print area of the security printing and the perforating area of the double punching are determined to overlap; and printing the security printing at the print position which has been adjusted using a printing engine.

3. A non-transitory computer-readable storage medium storing a program that, when executed by a computer having a processing circuitry, causes the computer to execute a method of security printing for an image forming apparatus connected to a post processing apparatus, comprising the steps of:

detecting a size of a sheet to be conducted with print processing;

acquiring a dividing number of the sheet;

dividing the sheet into a plurality of areas based on the sheet size detected at the sheet size detection step and the dividing number acquired at the dividing number acquiring step;

acquiring a position of security printing; and determining a print position of security printing on each of the plurality of areas, divided at the sheet dividing step, based on the position of security printing acquired at the security printing setting acquiring step;

changing magnification of a size of a target-print image and a size of security printing based on the sheet size which has been detected and the dividing number which has been acquired;

acquiring a setting of an image direction of the target-print image; and rotating the target-print image and the security printing with a given angle based on the image direction which has been acquired and the dividing number which has been acquired, wherein the post-processing apparatus includes a punch unit having a plurality of perforators for perforating holes at the center and one end of the one sheet in a conveyance direction of the sheet, wherein the method further comprises:

acquiring information of a shape and a number of perforators of the punch unit;

determining whether a print area of the security printing and a perforating area of double punching by the punch unit overlap based on security printing position which has been acquired and the shape and number of the perforators which has been acquired;

adjusting a print position of security printing to avoid overlapping of the print area of the security printing and the perforating area of the double punching when the print area of the security printing and the perforating area of the double punching are determined to overlap; and printing the security printing at the print position which has been adjusted using a printing engine.

* * * * *